March 31, 1970 P. BAUER ET AL 3,503,411
PURE FLUID AUTOMATIC CARGO CONTROL SYSTEM
Filed June 12, 1967 5 Sheets-Sheet 1

INVENTORS
PETER BAUER &
EDWIN U. SOWERS, III

BY Hurvitz, Rose & Greene
ATTORNEYS

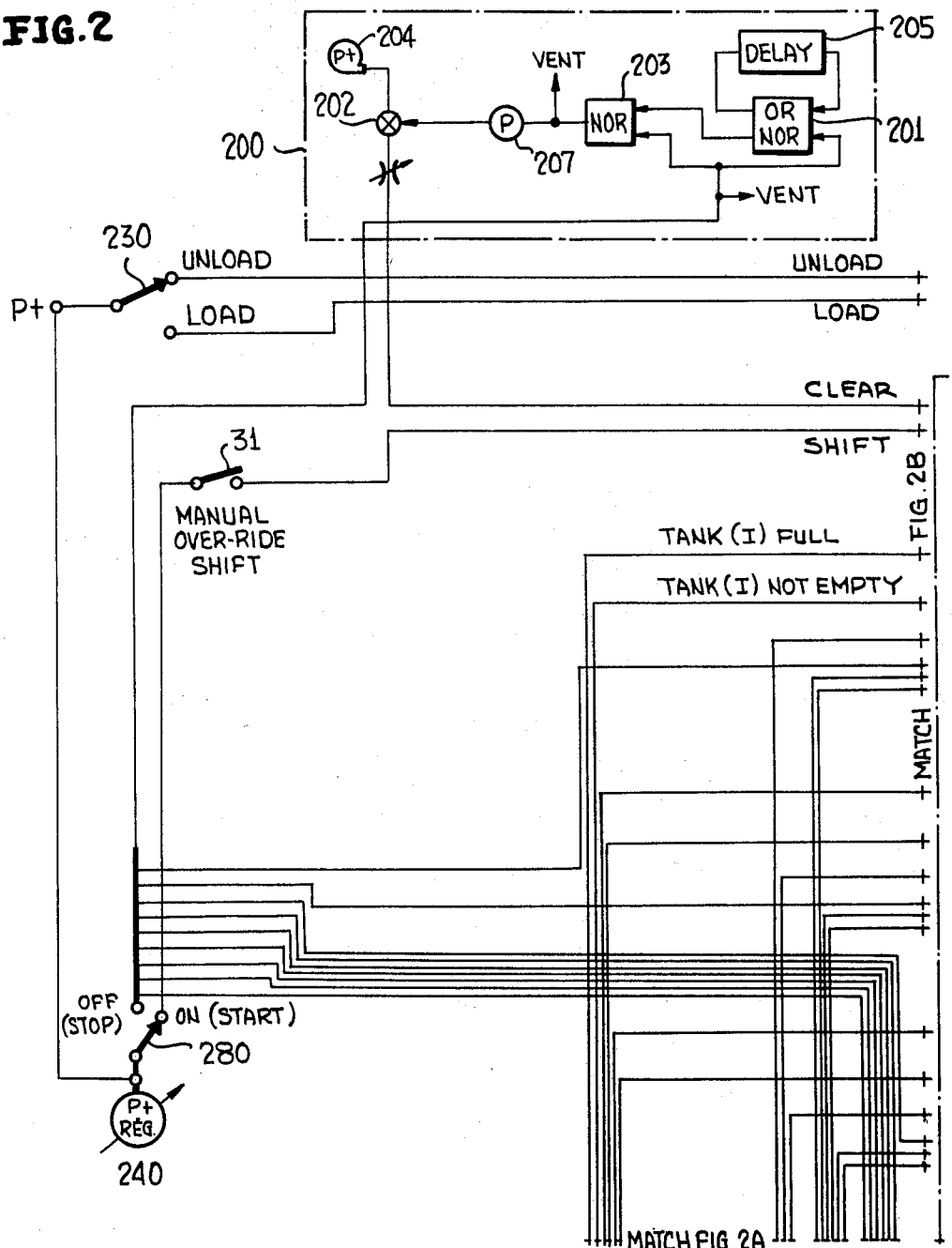

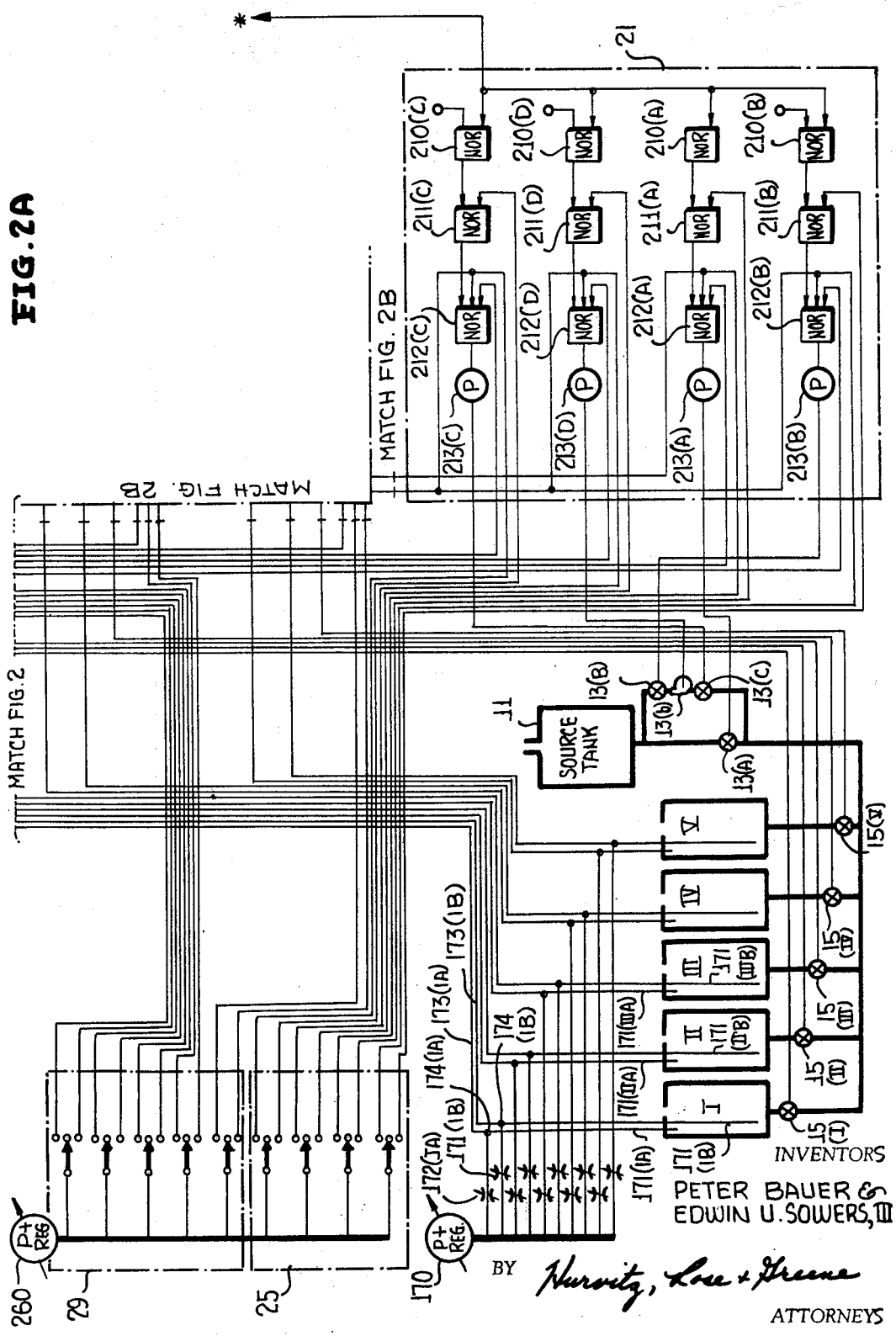

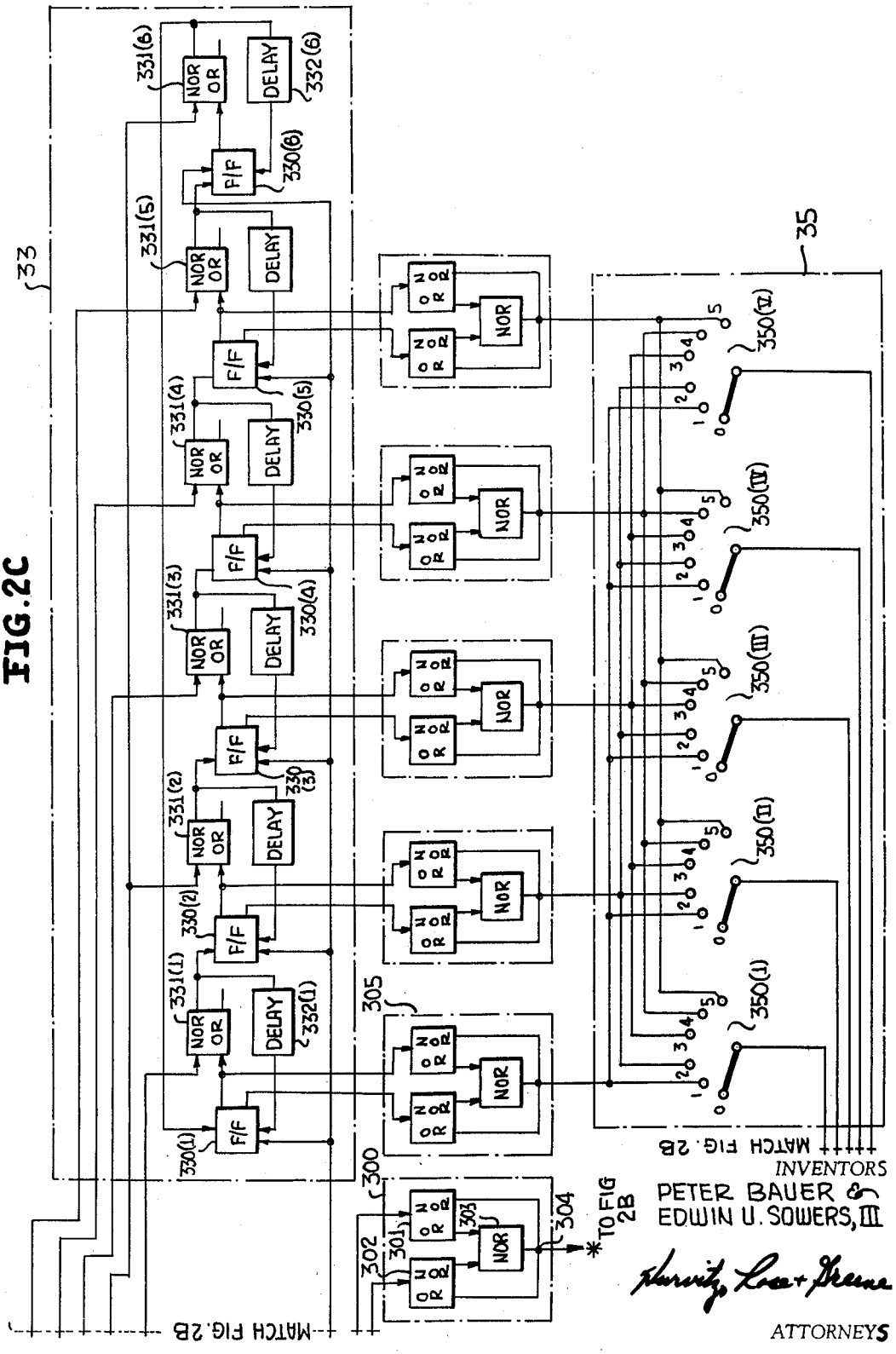

United States Patent Office 3,503,411
Patented Mar. 31, 1970

1

3,503,411
PURE FLUID AUTOMATIC CARGO CONTROL
SYSTEM
Peter Bauer, Germantown, and Edwin U. Sowers III,
Silver Spring, Md., assignors to Bowles Engineering
Corporation, Silver Spring, Md., a corporation of
Maryland
Filed June 12, 1967, Ser. No. 645,115
Int. Cl. G05d 11/00; F15c 1/08; G06m 1/12
U.S. Cl. 137—101.25                             29 Claims

ABSTRACT OF THE DISCLOSURE

A system for loading and/or unloading any or all of a plurality of tanks in a freely selectable programmed sequence, there being provided remote means for manually overriding the programmed sequence at any time during the loading or unloading cycle such that the loading or unloading of a programmed tank or tanks can be terminated in favor of the loading or unloading of the next programmed tank or tanks in the sequence, and such that the original preselected sequential order can be changed with respect to any of the remaining tanks which have not been loaded or unloaded in accordance with the preselected sequential order. There is additionally provided a circuit for assuring that the system is preset to a proper stand-by condition when system power is initially applied. There is also provided a flow amplifier for binary fluid flow signals comprising plural bistable pure fluid amplifiers, each responsive to a binary fluid flow signal so as to provide respective plural fluid flow output signals, the flows from which are combined to provide the amplified signal.

Background of the invention

The present invention relates to an automatic control system for selectively loading and unloading a plurality of storage tanks, and more particularly to a system control having provisions for loading and unloading fluid into a plurality of storage tanks in a predetermined sequence, and for modifying the predetermined sequence at any time including during the loading or unloading cycle.

Control systems for loading storage tanks are well known in the prior art. One form of prior art tank loading control provides for simultaneous loading of all of the tanks, there being sensors provided to terminate flow to each individual tank as it becomes full. Another form of prior art storage tank loading control provides for sequential filling of individual tanks in accordance with a predetermined program, there being sensing means provided to terminate flow into each tank as it becomes full and to initiate flow into the next programmed tank. Still other prior art tank loading control systems provided for sequential filling of individual tanks in an order determined by the existence of empty tanks whose liquid level condition is sensed by a scanning type of mechanism. Yet another prior art storage tank control includes means for preventing flow into any tank from which the contents are being drained regardless of the position of that tank in a predetermined programmed sequence. A major disadvantage associated with all of these prior art systems resides in the lack of flexibility with respect to choice of loading sequence and with respect to modification of a loading sequence once it has begun. In a number of storage tank loading applications this flexibility is not only advantageous but necessary. One such application is liquid cargo loading and unloading of ships such as tanker vessels. The necessity for flexibility in loading or unloading sequences for such vessels arises from ballast considerations, since an unevenly distributed cargo can result in severe listing or even capsizing.

Summary of the invention

The novel control system of this invention provides a highly flexible control apparatus for programming the order in which a plurality of storage tanks are to be loaded or unloaded. Specifically, the control system of this invention includes: means for initially establishing a desired sequential order in which any or all of the storage tanks are to be loaded or unloaded, it being possible to program one or more tanks into any position in the sequence; means for stopping the loading or unloading of any tank when the fluid cargo level therein has reached a preestablished level, and for automatically directing cargo flow to the next programmed tank in the preselected sequential order; means for automatically shutting off the main cargo fluid supply after a sequence has been completed; and manual override means for altering the loading or unloading sequence at any time so that the liquid can be directed from a tank being loaded or unloaded to the next programmed tank, or alternatively so that tanks which have yet to be loaded or unloaded may have their position in the sequence modified as desired.

The control system described herein takes the form of a digital logic system comprised primarily of pure fluid logic devices, wherein the presence of a fluid pressure signal represents a binary one and the absence of a fluid pressure signal represents a binary one and the absence of a fluid pressure signal represents a binary zero. As similar logic systems employing mechanical or electronic logic devices will become readily apparent to one skilled in the art upon reading the description below, it is not intended that the scope of this invention be limited to the use of pure fluid devices.

In another aspect of the present invention a novel pure fluid amplifier for binary flow signals is provided, the flow amplifier being utilized in the control system described above to provide flow amplification in instances where binary signals are required to drive a large number of pure fluid devices.

Still another aspect of the present invention involves provision of a novel preset logic circuit for digital logic systems, the novel circuit comprising a pair of pure fluid logic devices employed to control a preset signal so as to assure that the preset signal is always present when the system is turned on thereby preventing system operation from proceeding from an undetermined initial condition.

It is therefore an object of the present invention to provide a system in which a plurality of storage tanks are loaded or unloaded with fluid material in accordance with a preselected sequence, there being means provided for manual override of said sequence during any part of the operating cycle thereof.

It is another object of the present invention to provide a control system for programming fluid flow into or out of a plurality of storage tanks in any predeterminable sequence and for altering said sequence by at any time proceeding to the next step in the sequence.

It is still another object of this invention to provide a control system in which a plurality of storage tanks are loaded in accordance with a predetermined sequence wherein the unexecuted portion of the sequence is modifiable at will during operation.

It is still another object of this invention to provide a novel pure fluid amplifier for binary fluid flow signals.

It is yet another object for the present invention to provide a novel circuit for assuring proper preset conditions of a logic system at the time the system is turned on.

The above and still further objects, features and advantages of the present invention will become apparent upon consideration of the following detailed description of one specific embodiment thereof, especially when taken in conjunction with the accompanying drawings, wherein:

Brief description of the drawings

FIGURES 2, 2A, 2B, and 2C are portions of a schematic diagram of the embodiment illustrated in FIGURE 1, the interconnections between these drawings being indicated by respective match lines.

Description of preferred embodiments

Figure 1:
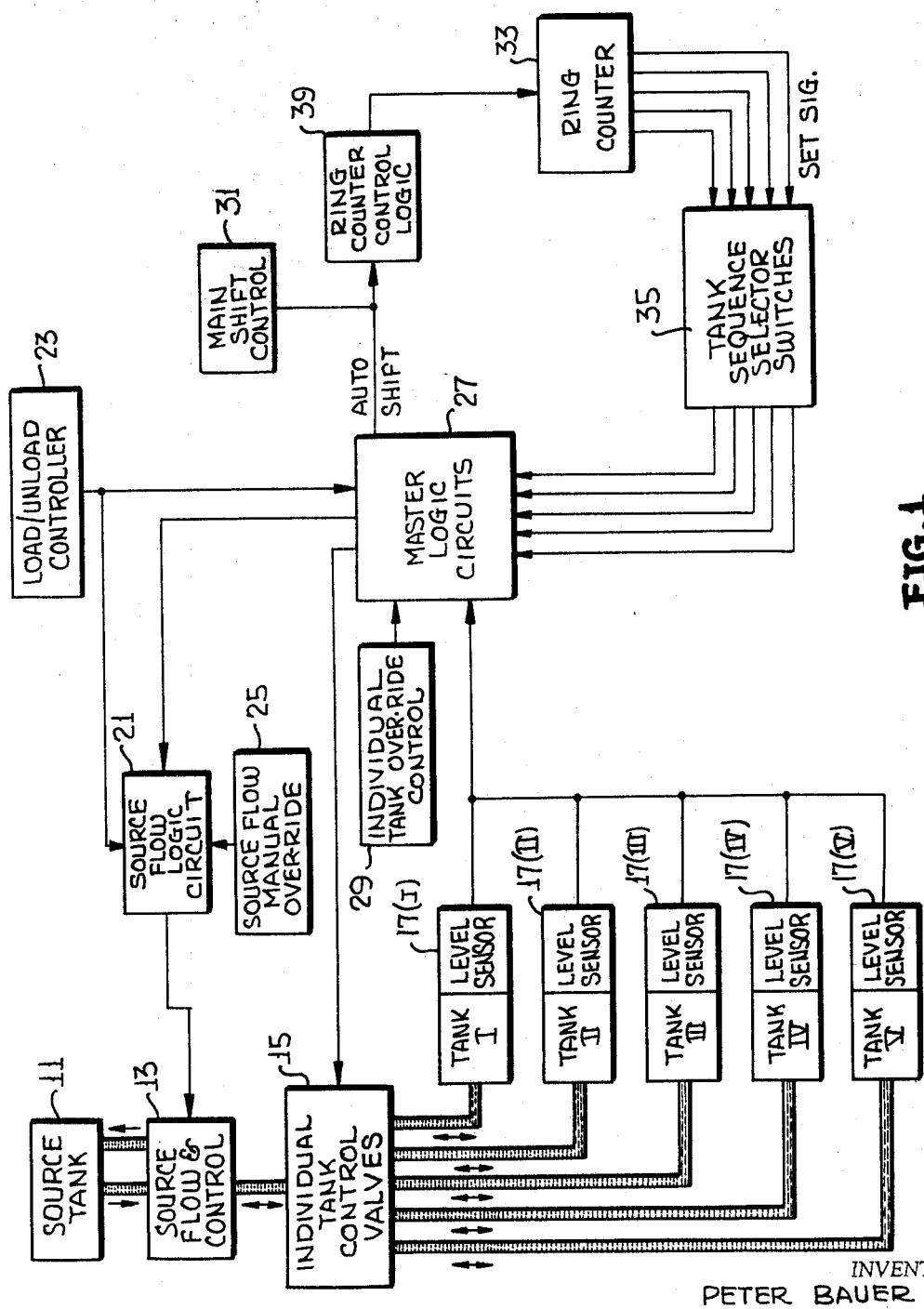
FIGURE 1 is a block diagram representing one embodiment of the present invention.

Referring now specifically to FIGURE 1, there is illustrated a block diagram for a system constructed in accordance with the principles of the present invention for controlling the conduction of liquid to and from five individual storage tanks I, II, III, IV, and V, respectively. While the system, as illustrated, is specific to the control of five storage tanks, it will be readily apparent from the disclosure which follows that any number of such tanks may be employed and controlled in a similar fashion. In addition, while the tanks are described herein as being loaded or unloaded with liquid material, it is considered within the scope of this invention that gaseous material or fluent solids (pulverized material in gas) may be similarly loaded or unloaded. A source 11 is considered for purposes of this disclosure to be a tank and to provide the main liquid supply from which the storage tanks are to be loaded or into which they are to be unloaded. Any number of such source tanks may be employed, it being evident that the type of source is dependent upon the particular application and that a single source tank 11 is shown only to facilitate the description which follows.

Source flow control unit 13 may be controlled by the logic system as subsequently described to permit or prevent flow of liquid to or from source tank 11. The source flow control unit 13 comprises a pump and a plurality of control valves and is described in greater detail with reference to the schematic drawing of the system below. A plurality of individual control valves for respective ones of storage tanks I–V are represented by the block 15. The purpose of these individual valves is to permit liquid to flow to or from respective ones of the storage tanks in accordance with the logic signals received from the control system, each valve being connected between its respective tanks and the source flow control unit 13. Associated with the storage tanks I–V are a plurality of level sensor units 17(I), 17(II), 17(III), 17(IV), and 17(V), respectively, from which fluid logic signals are conducted to the control system to be subsequently described. The function of these level sensor units 17 is to provide an indication that a particular tank has been filled with liquid in the case of a loading operation or emptied of liquid in the case of an unloading operation. This fluid indicator signal is therefore operative to permit the control system to advance to the next step of the programmed sequence.

Source flow control unit 13 receives logic signals from a source flow logic circuit 21 operative to energize and deenergize the valves and pump of the source flow control 13 so as to control the flow and direction of flow of liquid with respect to source tank 11. Source flow logic circuit 21 is connected to receive an input signal from the LOAD/UNLOAD controller unit 23 which is an operator controlled two-position switch for placing the system in the load or unload mode. When the switch of unit 23 is in its load position, liquid can only flow out of source tank 11, and conversely, for the UNLOAD position of the switch of unit 23, liquid is only permitted to flow into source tank 11. In addition, the source flow logic unit 21 is connected to receive input signals from the source flow manual override unit 25. Unit 25 comprises four three-position switches, one each associated with a different valve in the source flow control unit 13. The four switches are normally positioned to permit automatic operation of their respective valves, but can be activated at any time to override automatic operation and energize or de-energize said members accordingly. A third input signal to the source flow logic circuit 21 emanates from the master logic circuits 27, this latter signal serving to maintain the valves in source flow control unit 13 in the proper condition to permit liquid flow to or from source tank 11 while the automatic programmed sequence is cycling, subject, of course, to override control by source flow manual override switch unit 25.

The master logic circuits 27 additionally provide control signals to the individual tank control valves 15 so that the appropriate storage tanks I–V are in fluid communication with source tank 11 as destermined by the automatically and manually controlled logic conditions to be described. The master logic circuits 27 receive a signal from the LOAD/UNLOAD controller 23, such signal indicating the load or unload mode of the system, and also receives appropriate signals from the individual tank override control 29, the latter comprising five three-position switches, usually though not necessarily identical to those empolyed in unit 25. These five switches are normally positioned to permit automatic operation, but are actuable to open or close the individual control valves 15 for their respective storage tanks I–V so as to override automatic operation when required. In addition, the master logic circuits 27 receive appropriate signals from the level sensors 17 in order to permit circuits 27 to determine whether loading or unloading has been completed in an individual tank and control the valves 15 in accordance with this information. Upon receipt of a full (in load mode) or empty (in unload mode) indication from the level sensor units, the master logic circuits 27 are primed to provide an AUTOMATIC SHIFT signal, such signal serving to indicate the next step in the automatic programmed sequence.

The AUTOMATIC SHIFT signal is connected to a ring counter control unit 39 along with a MANUAL SHIFT signal from an operator-controlled manual shift control switch 31. The manual shift control switch 31 is a normally-open spring-loaded switch that can be momentarily actuated to generate the MANUAL SHIFT signal to terminate any step in the automatic sequence and effect a shift to the next programmed step. Upon receipt of either the MANUAL SHIFT or AUTOMATIC SHIFT signal, the ring counter control 39 produces a signal shift in ring counter 33. Ring couter 33 is a six stage closed loop shift register which during operation always has one of its six stages in a SET condition and the remaining five stages in the RESET condition, the set stage being sequentially shifted through the counter upon receipt of successive shift pulses at ring counter control 39. The step of the system loading or unloading sequence is at any time determined by the particular stage of the ring counter 33 that is in a SET condition.

SET signals, representing SET conditions for the first five stages of ring counter 33 are connected to the tank sequence selector switch unit 35, the latter unit comprising five identical six-position switches, each switch being associated with a respective one of tanks I–V. Each of the switches in unit 35 may be manually placed in either an OFF position or in any one of five other positions representing five possible sequential steps in a system loading or unloading sequence. When in position 1, for example, a switch connects the SET signal from the first stage of ring counter 33 to the valve 15 associated with that particular switch via circuits 27, and in position 2, each switch connects a SET signal from ring counter stage two to its said valve, etc. In this manner, any one or more or all tanks (I–V) can be arranged to be loaded or unloaded during any step of a complete ring counter cycle.

Figure 2B:
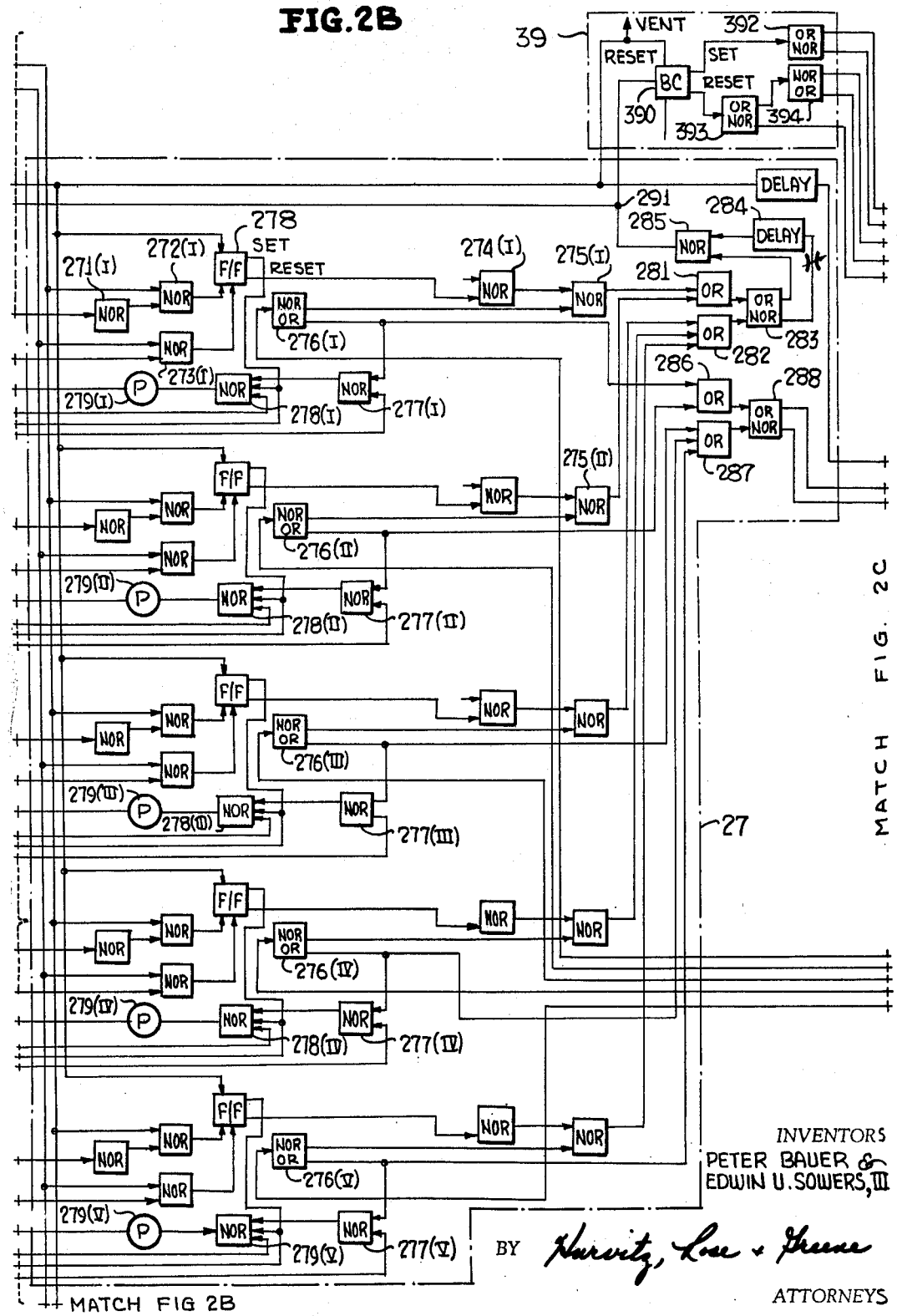

The individual blocks referred to above in relation to FIGURE 1 are illustrated in greater detail in the schematic diagram of the system of this invention in FIGURES 2, 2A, 2B, and 2C. As depicted in FIGURE 2A the tank of source 11 is arranged in relation to the storage tanks 1, II, III, IV, and V so that the liquid flow in a loading operation of the storage tanks is accomplished by means of gravity feed via valve 13(A) and appropriates ones of the individual storage tank control valves 15(I), 15(II), 15(III), 15(IV) and 15(V) for respective ones of storage tanks I, II, III, IV, and V. The unloading of the storage tanks is illustrated as being accomplished by means of a pump 13(D) and valves 13(B) and 13(C), the latter two valves and pump being connected in a series fluid conduction path, the path being connected in parallel with the fluid path including loading control valve 13(A). It is to be understood that the gravity feed loading and the pump feed unloading of the storage tanks is entirely arbitrary, and that any suitable fluid feeding type of arrangement may be employed for either the loading or unloading modes. The various valves 15(I–V), and 13(A–C) are all of the normally closed type and for the sake of the embodiment disclosed herein are described as being of the solenoid type, operable to permit flow upon receipt of an electrical signal. In addition, pump 3(D) is considered to be of the type which pumps fluid on application of an electrical signal thereto.

The storage tank level sensors 17(I–V) of FIGURE 1 comprise a plurality of fluid conducting tubes or pipes in communication with a regulated source of pressurized fluid 170. More specifically, each tank has a pair of fluid conducting tubes 171 extending therein to different tank depths. As the sensors for each of the individual storage tanks are identical, the same reference numerals are employed herein for each tank, the respective numerals having the respective tank number and the letter A or B suffixed thereto in parenthesis, the letter A representing the load mode level sensor and the letter B the unload mode level sensor. Thus the load mode level sensor for tank I includes tubing 171(IA) which extends through the top of tank I to a relatively shallow depth, with its other end communicating with source 170 via adjustable flow restrictor 172(IA). Flow restrictors 172 permit adjustment for the fluid appearing at the storage tank end of tubing 171. A further fluid conducting tube 173(IA) is associated with level sensing in tank I during the load mode and is connected to a common junction 174(IA) between tube 171(IA) and restrictor 172(IA). Tubing 173(IA) serves to carry a fluid pressure signal indication to the master logic circuit 27 when tank I is filled with cargo liquid. This fluid signal is not present when tank I is not filled to the level to which tube 171(IA) extends since the pressurized fluid received at junction 174(IA) is vented to the ambient or atmospheric pressure present in tank I in the region above its liquid level. When the tank is filled to the level of tube 171(IA) however, the cargo liquid blocks this venting action and the pressurized fluid is diverted to tube 173(IA).

The unload mode level sensing tube 171(IB) for tank I is operated on the same principle as the load mode sensor so that a fluid signal is provided at the master logic circuits 27 via tubing 173(IB) whenever the cargo liquid in tank I is at a higher level than the lower end of tube 171(IB). Thus, there is a fluid signal present in tube 173(IB) unless tank I is substantially empty, for it is only under such conditions that junction 174(IB) can be effectively vented.

The source flow logic circuit 21 of FIGURE 1 comprises four groups of three cascaded pure fluid NOR gates, each group providing the control logic for a respective one of control valves 13(A, B, and C) and pump 13(D). The four groups of NOR gates are illustrated in FIGURE 2A and are substantially identical so that each group is affixed with identical reference numerals for corresponding elements, there being the letter A, B, C and D suffixed thereto to indicate the valve or pump being controlled. These and all of the pure fluid OR and NOR gates described herein may be of the type illustrated and disclosed in U.S. Patent No. 3,240,219 to E. M. Dexter and D. R. Jones, wherein the OR and NOR logic functions are represented by respective OR and NOR fluid output signals. It will be remembered that valve 13(A) is to be opened to permit liquid cargo gravity feed from source tank 11 to one or more of storage tanks I–V. NOR gate 210, which is the first of the cascaded NOR gates in the logic group controlling valve 13(A), is connected so as to operate as a logic inverter since it receives only one input signal, that being an AUTOMATIC SEQUENCE OFF signal from the master logic circuits 27. As is the case with all NOR gates, NOR gate 210(A) produces an output signal only in the absence of all input signals, so that there is a binary one output signal produced by NOR gate 210(A) whenever the AUTOMATIC SEQUENCE OFF signal is not received, i.e., binary zero. As will be described in greater detail subsequently, the AUTOMATIC SEQUENCE OFF signal is in a binary one state, whenever an automatic loading or unloading sequence is cycling and is in a binary zero state at all other times. The NOR output signal NOR gate 210(A) provides an input signal to NOR gate 211(A), the second NOR gate in the group of three cascaded NOR gates controlling valve 13(A). NOR gate 211(A) receives a second input signal from a manually controlled switch 25(A) in the source flow manual override unit 25. There are four switches 25(A–D) in unit 25, each providing complete manual override control for a different respective one of valves 13(A–C) and pump 13(D). Switch 25(A) is a three-position fluid flow toggle switch having a center arm connected to receive pressurized fluid from a source 260. The switch is normally placed in its AUTOMATIC position wherein it conducts no fluid and does not disturb automatic loading or unloading of the storage tanks. When placed in either of its OPEN or CLOSED positons, switch 25(A) is intended to respectively open or close the valve 13(A) regardless of the status of an automatic sequence. When in the open position switch 25(A) conducts pressurized fluid from source 260 to NOR gate 211(A) providing the aforesaid second fluid input signal. Since either the open position of switch 25(A) or a binary one output signal from NOR gate 210(A) inhibit the NOR output signal from NOR gate 211(A), said signal remaining in its binary zero condition, a binary one output signal from NOR gate 211(A) is provided whenever there is no automatic sequence occurring or when the manual override switch 25(A) for valve 13(A) is in its OPEN position. The NOR output signal from NOR gate 211(A) provides an input signal to NOR gate 212(A). Another input signal to NOR gate 212(A) is provided by the LOAD/UNLOAD control switch 230 (FIGURE 2), a two-position fluid toggle switch providing a pressurized fluid input signal from a source 240 to NOR gate 212(A) whenever it is placed in the UNLOAD position. Still another input signal to NOR gate 212(A) comes from manual override switch 25(A) when the latter is placed in the CLOSED position, in which position it is intended that valve 13(A) be closed. Yet another input signal is provided at NOR gate 212(A) from the START/STOP switch 280 (FIGURE 2), which is identical to the LOAD/UNLOAD switch 230, and which, when placed in the STOP position, provides a pressurized fluid signal from source 240 to NOR gates 212. Thus, the NOR gate 212(A) will only produce a binary one output signal under the following circumstances: (1) START/STOP switch 280 is *not* in the STOP position; and (2) LOAD/UNLOAD switch 280 is *not* in the UNLOAD position; and (3) the manual override control switch 25(A) for valve 13(A) is *not* in the CLOSED position; and (4) there is either an automatic programmed sequence in progress or the manual override control switch 25(A) is in the OPEN position. When all of these four conditions are met the binary one signal from NOR gate 212(A) activates a pressure transducer 213(A) which is responsive to fluid pressure to generate an appropriate electrical signal to activate and thereby open valve 13(A) to permit flow between the source tank 11 and the storage tank valves 15. Fluid pressure-to-electrical signal transducers such as devices 213 are conventional and therefore need not be described in detail.

It is to be noted that the NOR gates 210, 211, and 212 associated with control valves 13(B) and 13(C) and with pump 13(D) operates in a manner identical with NOR gates 210(A), 211(A) and 212(A), receiving binary pressure signals from appropriate override switches in unit 25 and from the LOAD/UNLOAD switch 230 in the LOAD position as opposed to the UNLOAD position as is the case for the valve 13(A) control logic.

The master logic circuits 27, illustrated in FIGURE 2B, comprise five identical groups of logic circuitry, each group respectively associated with a particular storage tank. To avoid redundancy, only one such group (for tank I) will be described in detail, it being understood that the reference numerals associated with the units in each group are identical for corresponding elements, there being a tank number parenthetically suffixed to each reference numeral to indicate its relationship to that tank. The TANK I FULL signal on fluid conducting tube 173 (IA) is connected as an input signal to NOR gate 271(I) which has only one input signal applied thereto and therefore acts, in effect, as a logic inverter circuit. The output signal from NOR gate 271(I) is connected as an input signal to NOR gate 272(I) which receives a second input signal from the LOAD/UNLOAD switch 230 in its UNLOAD position. Similarly, the TANK I NOT EMPTY signal from fluid conducting passage 173(IB) is connected as an input signal to NOR gate 273(I) which receives a second input signal from the LOAD/UNLOAD switch 230 in its LOAD position. It is seen that NOR gate 272(I) is inhibited (that is, provides a binary zero output signal) whenever the LOAD/UNLOAD switch 230 is in its UNLOAD position, and the NOR gate 273-(I) is inhibited whenever the LOAD/UNLOAD switch 230 is in its LOAD position. Thus, NOR gate 272(I) provides a binary one output signal only when the system is in the load mode *and* tank I is full, and NOR gate 273(I) provides a binary one output signal only when the system is in the unload mode *and* tank I is empty. The output signals from both NOR gates 272(I) and 273(I) are connected as input signals to a pure fluid flip-flop 270(I). Flip-flop 270(I) is a pure fluid bistable memory device such as the type described in U.S. Patent No. 3,225,780 to R. W. Warren. Flip-flop 270(I) is initially reset by an input CLEAR signal at system turn-on, whereby a binary one output signal appears at the RESET output passage. The generation of the CLEAR signal is described in greater detail below. The output signals from NOR gates 272(I) and 273(I) are both connected as control streams on the opposite side of the flip-flop power stream from the CLEAR signal. Thus, a binary one output signal from either of gates 272(I) or 273(I) acts to produce a power stream switching action which results in the power stream being directed to the SET output passage, as opposed to the RESET passage to which the clear signal had set the power stream. The RESET output passage of flip-flop 270 (I) is connected to provide its binary one output signal as an input signal to NOR gate 274(I), the latter having only one input signal connected thereto so as to effectively function as a logic inverter. Thus when flip-flop 270(I) is in the RESET condition, NOR gate 274(I) is inhibited and provides a binary zero output signal, and when the flip-flop is in the SET condition, there is a binary one output signal from NOR gate 274(I). The output signal from NOR gate 274(I) provides an input signal to NOR gate 257(I) which receives a second input signal from the NOR output signal of OR/NOR gate 276(I). Gate 276(I) may be of the same type as employed for the NOR gates above, with both the OR and NOR output signals being separately utilized. The sole input signal to OR/NOR gate 267(I) originates from the tank sequence selector switches 35 of FIGURE 1, and is present whenever the automatic programmed sequence indicates that it is time for tank I to be loaded or unloaded. Thus, when tank I is not to be loaded or unloaded the NOR output signal from gate 276(I) is in the binary one state and acts to inhibit NOR gate 275(I). The output signal from NOR gate 275(I) is connected as an input signal to OR gate 281, which also receives a binary input signal from the output passage of NOR gate 275(II). A three-input OR gate 282 receives input signals from NOR gates 275 of master logic circuits for tanks III, IV, and V and the output signals from OR gates 281 and 282 are both connected as input signals to an OR/NOR gate 283. The two OR gates 281 and 282 thus act as a composite five-input OR gate which produces a binary one output signal when any of the NOR gates 275(I–V) are activated. The OR gates 281 and 282 may be identical to the NOR gates employed above but having their OR output passages employed rather than their NOR output passages. The OR output signals from gates 281 and 282 comprise the only input signals to an OR/NOR gate 283. The NOR output signal from OR/NOR gate 283 is connected through an appropriate fluid signal delay circuit 284 to an input passage of NOR gate 285. Delay circuit 284 may be a simple fluid capacitor, or other such device suitable for providing a fluid signal delay commensurate with the operation to be described below. The OR output signal from OR/NOR gate 283 is connected as the second and only other input signal to NOR gate 285. The circuitry comprising OR/NOR gate 283, delay circuit 284, and NOR gate 285 comprises a pulse shaper which permits generation of a fluid pulse having sharp leading and trailing edges upon removal of a binary one signal from any of NOR gates 275 (I–V) output passages. This generation of a sharp pulse occurs in the following manner: With flip-flop 270(I) providing a binary one RESET output signal initially due to the CLEAR signal having been previously generated, the output signal therefrom is connected to inhibit NOR gate 274(I); if the automatic program is such that NOR gate 276(I) receives a binary one input signal from the tank sequence selector 35, indicating that tank I is to be loaded or unloaded, there is no NOR output signal from gate 276(I); with no NOR signal from gate 276(I) and no NOR signal from gate 274(I), NOR gate 275(I) is not inhibited and therefore generates a binary one signal which activates OR gate 281 which produces a binary one OR output signal from OR/NOR gate 283 which in turn inhibits NOR gate 285; when tank I fills, as sensed by tubing 171(I-A), an output signal is removed from NOR gate 271(I) so as to enable NOR gate 272(I) to produce a binary one output signal which causes flip-flop 270(I) to change states; this results in the removal of the RESET binary one signal from the flip-flop RESET output passage, which in turn activates NOR gate 274(I) to provide a binary one signal to inhibit NOR gate 275(I). When NOR gate 275(I) is inhibited it removes the input binary signal from OR gate 281 which in turn removes the OR output signal from OR/NOR gate 283 and switches the binary one output to the NOR side of OR/NOR gate 283;

however, NOR gate 283 cannot provide a NOR signal to NOR gate 285 until an appropriate delay period as introduced by network 284 has passed, and thus no inhibiting signal is applied at the input of NOR gate 285 during this delay period immediately after tank I has been filled; thus, during this short delay period NOR gate 285 provides a sharp fluid output pulse, which, as will subsequently be described, serves to activate the sequence circuitry so as to initiate the next step in the automatic loading sequence. In addition to the NOR output signal from OR/NOR gate 276(I) there is also an OR output signal generated therefrom which is in a binary one state any time tank I is to be filled or emptied in accordance with the automatic sequence and which is connected to provide input signals to OR gate 286 and to NOR gate 277(I). OR gate 286 is a two input OR gate similar to OR gate 281 and additionally receives an input signal from the OR/NOR gate 276(II) corresponding to gate 276(I) but associated with tank II. An additional OR gate 287, similar to gate 282, is connected to receive three input signals from three respective OR/NOR gates 276(III-V) associated with tanks III, IV and V, respectively. The output signals from OR 286 and 287 are connected as input signals to an OR/NOR gate 288 which has both its OR and NOR output passages connected to the two input passages of a novel fluid flow amplifier 300 (FIGURE 2C) provided in accordance with this invention. Fluid flow amplifier 300 will be described in detail subsequently, suffice it to say for the present that it amplifies the flow produced by a binary one NOR output signal from OR/NOR gate 288 and inhibits a binary one output signal from the OR output passage or OR/NOR gate 288. It can now be readily seen that when there is a binary zero output signal at the OR output passage from OR/NOR gate 276(I) and similarly a binary zero signal from all the other OR output passages of the OR/NOR gates 276(II-V), the OR gates 286 and 287 provide binary zero output signals and there is a NOR output signal from NOR gate 288. Thus, when none of the various tanks are in the middle of a loading or unloading sequence the OR/NOR gate 288 NOR output passage provides the AUTOMATIC SEQUENCE OFF to NOR gates 210(A-D) (FIGURE 2A) in unit 21 with the resultant effect of closing valves 13(A, B, C) and de-energizing pump 13(D).

As mentioned above, the OR output signal from OR/NOT gate 276(I) is connected to NOR gate 277(I) which additionally is provided with an input signal from the tank I override control switch 29(I) (FIGURE 2A) in OPEN position. Switch 29(I) is identical to switch 25(A) described above as the override control for valve 13(A), switch 29(I) providing a pressurized fluid signal from source 260 as an input to NOR gate 277(I) whenever it is desired to open control valve 15(I) regardless of the automatic sequence operation. Five such switches 29(I-V) are provided in the individual tank override control unit 29, each switch being associated with a respective storage tank. Thus, NOR gate 277(I) produces a binary one output signal only when tank I is not being loaded or unloaded or when the manual override switch 29(I) is in the OPEN position. The output signal from NOR gate 277(I) provides an input signal to OR/NOR gate 278(I), which gate is also provided with three other input signals including: the SET output signal from flip-flop 270(I); a signal from the START/STOP switch 280 in the STOP position; and a signal from a manual override switch 29(I) in CLOSED position. The NOR output signal from OR/NOR gate 278(I) is connected to a pressure transducer 279(I) which is identical to pressure transducers 213 employed in unit 21. Pressure transducer 279(I) provides an electrical signal in response to the NOR output signal from NOR gate 278(I) to activate normally closed valve 15(I) so as to permit fluid flow to or from storage tank I. Since any signal at the input side of OR/NOR gate 278(I) will inhibit the NOR output signal therefrom and thus prevent opening of control valve 15(I), it is evident that by placing the tank I override switch 29(I) in the closed position or by placing the START/STOP switch 280 in the STOP position, one may insure that valve 15(I) remains closed regardless of the automatic sequence. It is further evident that when tank I becomes full, the TANK I FULL signal generated in tubing 173(IA) inhibits NOR gate 271(I), in turn activating NOR gate 272(I) to therefore cause flip-flop 270(I) to switch from its RESET condition to its SET condition. This in turn acts to inhibit NOR gate 278(I) so as to insure that valve 15(I) is closed and that no further loading of tank I is permissible. It is to be noted that by placing override switch 29(I) in the OPEN position NOR gate 277(I) is inhibited to thereby remove an inhibiting signal from OR/NOR gate 278(I). This then tends to open the control valve 15(I) unless START/STOP switch 280 is in the STOP position or tank I is full. Placing manuel override switch 29(I) in the closed position however inhibits OR/NOR gate 278(I) so that valve 15(I) cannot be opened regardless of the condition of any other switch or logic element.

When the system is in the unload mode the LOAD/UNLOAD switch in its UNLOAD position inhibits NOR gate 272(I) but NOR gate 273(I) is not inhibited and therefore is operative when tank I is empty (binary zero signal in conducting passage 173(IB)) to effectuate switching of flip-flop 270(I) in the same manner as flip-flop 270(I) was switched in the load mode by a signal received from NOR gate 272(I). Thus, generation of a pulsed output signal from NOR gate 285 and the control of valve 15(I) from NOR gate 272(I) take place upon tank I becoming empty during the unload mode just as they did upon the tank becoming full in the load mode.

As discussed above, the pulsed signal generated by NOR gate 285 is employed to initiate succeeding steps in an automatic programmed loading or unloading sequence. In addition, a manual shift pulse may be generated by actuating the normally open manual shift control switch 31 (FIGURE 2) which is a spring loaded fluid signal toggle switch. Switch 31 has its common contact connected to receive fluid under pressure from fluid pressure source 240 via the contacts of the START/STOP switch 280 in its START position. The normally open contact of switch 31 is connected in fluid communication with the output passage of NOR gate 285 at junction 291. From junction 291 the combined automatic and manual shift signals are connected to the ring counter control logic unit 39 of FIGURE 1. As illustrated in detail in FIGURE 2B, the counter control logic 39 comprises a commutating flip-flop 390 which changes states in response to successive shift pulses whether they are manual or automatic in origin. This commutating flip-flop 390 may be the pure fluid device disclosed in U.S. Patent No. 3,001,698 to R. W. Warren, and is normally preset in a normally RESET condition by the same CLEAR that presets flip-flop 278. Thus, under normal conditions there is a binary zero output at the SET output passage and a binary one output signal at the RESET output passage of flip-flop 390. The signal at the SET output passage is connected as an input signal to OR/NOR gate 392 while the signal from the RESET output passage of flip-flop 390 is connected as an input signal to the OR/NOR gate 393. It is seen therefore that when the commutating flip-flop is in its RESET condition, a binary zero signal appears at OR gate 392 which in turn provides a binary zero OR output signal and a binary one NOR output signal. Similarly, since under these conditions the signal at the SET output passage of the commutating flip-flop is a binary one, the OR output signal of OR/NOR gate 393 is in the binary one state while the NOR output signal at OR/NOR gate 393 is in the binary zero state. The OR output signal from OR/NOR gate 393 is connected to a further OR/NOR gate 394 which in turn under RESET conditions has a binary one OR output signal and a binary zero NOR output signal. It is evident therefore that any time there is a change of state in the commutating flip-flop 390 due to receipt at the input passage thereof of a manual or automatic shift pulse, there will be an associated change of state at all six output passages of the three OR/NOR gates 392, 393 and 394, respectively. These various output signals from the OR/NOR gates just described are utilized to control the sequencing of various stages in the ring counter 33 described below, it being understood that the OR/NOR gates 392, 393, and 394 serve to provide a degree of amplification of the basic output signals at the SET and RESET output passages of flip-flop 390 so that there is not too great a loading effect on that flip-flop from the various ring counter stages.

Ring counter 33 comprises six identical pure fluid counter stages, the first five of which represent the five respective sequential steps which may be part of a programmed sequence in which some or all of the storage tanks are to be loaded or unloaded, and the sixth ring counter stage representing a starting position for the ring counter before the programmed sequence has begun. Corresponding components in each stage of the ring counter are numbered identically on the drawing with suffixes attached thereto to indicate the stage to which the component belongs. Taking stage 1 as representative there is illustrated a flip-flop 330(I) which is preferably identical to flip-flop 278 described above. Flip-flop 330(I) receives the CLEAR signal as one input signal which initially resets flip-flop 330(I) to produce a binary one signal at its RESET output passage. A second input signal which acts to switch the power stream of flip-flop 330(I) from the RESET to the SET condition to produce a binary one signal at the SET output passage is received from the output passage of NOR gate 331(I) in stage 6 of the ring counter. A third input signal to flip-flop 330(I) is provided from the series combination of NOR gate 331(I) and delay circuit 332(I), NOR gate 331(I) being connected to the RESET output passage of flip-flop 330(I), from which it receives its only input signal. The function of this third input signal to flip-flop 330 (I) will be best understood from the ring counter operation described below. The output signal from NOR gate 331(I) is also transmitted to the second stage of the ring counter where it provides an input signal to flip-flop 330(2) and serves to switch said flip-flop from its RESET condition to its SET condition. The first five stages of the ring counter are placed in their RESET conditions at system turn-on by the CLEAR signal, so that each flip-flop 330 provides a RESET signal which inhibits the NOR gates 331 associated with each of respective stages 1-5. However, the sixth stage of the ring counter is set by the CLEAR signal so that a binary zero RESET signal is passed to NOR gate 331(6). Thus, under initial turn-on conditions all of the NOR gates 331 associated with the first five stages are inhibited by the binary one RESET signal from the flip-flops 330 associated with the respective stages, but NOR gate 331(6) receives a binary zero output from flip-flop 330(6) in stage 6 so that NOR gate 331(6) is not inhibited by that flip-flop. However, under turn-on conditions NOR gate 331(6) is inhibited by the binary one OR output signal from OR/NOR gate 394 to which a second input passage of NOR gate 331(6) is connected. Additional connections between the ring counter control logic and the NOR gates 331 are such that logic levels from the ring counter control logic alternate with succeeding stages of the ring counter. More specifically, under turn-on conditions, while NOR gate 331(6) receives the binary one OR signal from gate 394, NOR gate 331(I) receives a binary zero signal from the NOR output passage of NOR gate 393, NOR gate 331(2) receives a binary one signal from the OR output passage of OR/NOR gate 394, NOR gate 331(3) receives the binary zero NOR signal from the NOR gate 394, NOR gate 331(4) receives the binary one signal from the NOR output passage of OR/NOR gate 392 and NOR gate 331(5) receives the binary zero OR output signal from OR/NOR gate 393. Upon receipt of a manual shift pulse at commutating flip-flop 390, flip-flop 390 changes state and thereby forces OR/NOR gates 392, 393, and 394 to change state accordingly. The change of state of the OR output signal at OR/NOR gate 394 is a change from binary one to binary zero which has the effect of removing the only inhibiting input signal to OR/NOR gate 331(6). OR/NOR gate 331(6) is thus activated to provide an output signal which feeds back to stage 1 and causes flip-flop 330(I) to switch so that a binary one signal is present at its SET output passage and a binary zero signal is present at its RESET output passage. In addition, the output signal from NOR gate 331(6) is fed back through delay circuit 332(6) to switch flip-flop 330(6) to its RESET state, such switching providing a binary one RESET signal to inhibit OR/NOR gate 331(6). It is thus evident that the purpose of delay circuit 332(6) is to prevent flip-flop 330(6) from changing states and inhibiting NOR gate 331(6) before flip-flop 330(I) can be switched. The change of states at the various OR/NOR gates 392, 393, and 394 have no effect on stages 2–6 of the ring counter at this time since RESET conditions of the flip-flops 330(2–6) produce RESET signals to inhibit NOR gates 331(2–6) respectively. The binary one signal present at the SET output passage of flip-flop 330(I) is amplified by a pure fluid flow amplifier 305, identical to amplifier 300 employed to amplify the flow signal from OR/NOR gate 288. The flow signal from the SET passage of flip-flop 330(I), after having been amplified, is conducted to the tank sequence selector switches 35, the operation of which will be described subsequently.

Upon receipt of the next shift pulse (automatic or manual) at commutative flip-flop 390, another change of state occurs at flip-flop 390 and the associated OR/NOR gates 392, 393, and 394. These changes of states in the OR/NOR gates are reflected at the input sides of the NOR gates 331(1–6) of the ring counter such that stages 1 and 2 are the only ones to switch. More specifically, the binary zero output signal at the RESET passage of flip-flop 330(I) and the binary zero NOR signal from OR/NOR gate 393 permit NOR gate 331(I) to produce a binary one output signal which switches flip-flop 330(2) and which is also fed back through delay circuit 332(I) to switch flip-flop 330(I) to its RESET condition. Thus only one counter stage will have a flip-flop 330 in the SET condition at any time. Upon successive shift pulses appearing at flip-flop 390, the NOR gate 331 receiving an input signal from that set flip-flop becomes activated to effectuate switching of the flip-flop 330 in the next successive counter stage. In addition, the one counter stage that is in the SET condition generates a signal which is amplified and transmitted to the tank sequence selector switches. It is to be noted that stage 6 of the ring counter is not associated with a particular step in the automatic sequence, but rather with the stage which is in the SET condition at turn-on, before a sequence has begun.

The sequence selector switches 35 comprise five six-position rotary switches 350(I–V), each switch associated with a respective one of storage tanks I–V. The wiper arm of each switch comprises a movable fluid conducting passage which is communicable in each of its six positions with respective fluid passages. In addition, each wiper arm is connected to a different fluid passage so as to conduct fluid to a respective one of the five sections of the master logic unit 27, particularly, as the input signal to OR/NOR gates 276(I–V) as described in detail above. One of the six positions of each switch is an OFF position to which no fluid passages are connected so that the switches conduct no fluid signals to the master logic unit 27 when in the OFF position. Each of the remaining five positions of each switch is connected to the ring counter 33 in the following manner: The first positions (I) of all of the five switches 350(I–V) are connected to receive the SET output signal from flip-flop 330(1); the second positions (2) of each switch are connected to receive the SET output signal from flip-flop 330(2); the third positions (3) of each switch are connected to receive the SET output signal from flip-flop 330(3); and the fourth positions (4) of each switch are connected to receive the SET output signal from flip-flop 330(4); and the fifth positions (5) of each switch are connected to receive the set signal from flip-flop 330(5). It is evident that when all five switches 350 are connected in their one position (1), all five switches will conduct fluid from the SET output passage of flip-flop 330(1) through their respective wiper arms to their respective OR/NOR gates 276 in the master logic unit 27. Thus by positioning the switches 350(I–V) accordingly, any of the tanks can be loaded or unloaded during any step in the sequence. If it is only desired that tank I be loaded during the first step in the sequence, only switch 350(I) would be set to the (I) position, in which position the SET signal from flip-flop 330(I) is connected as the input signal to OR/NOR gate 276(I) so as to have the effects in the master logic unit which were described in detail above.

The fluid flow amplifier 300 associated with the output signal from OR/NOR gate 288 and the amplifiers associated with the output signals from each of the flip-flops 330(1–5) in the ring counter comprise novel means for providing fluid flow amplification for signals of the binary type. Since these flow amplifiers are identical, only amplifier 300 will be described in detail. The OR signal from OR/NOR gate 288 is connected as an input signal to the single input OR/NOR gate 301, and the NOR output signal from OR/NOR gate 288 is connected as the input signal to single input OR/NOR gate 302. The OR output signal from OR/NOR gate 301 and the NOR output signal from OR/NOR gate 302 are connected as the two input signals to NOR gate 303. The NOR output signal from the OR/NOR gate 301 and the OR output signal from OR/NOR gate 302 are connected together at junction 304 to which the NOR output signal from NOR gate 303 is also connected. Thus, when the OR signal from OR/NOR gate 288 is in the binary one state (thereby necessitating that the NOR signal from OR/NOR gate 288 is in the binary zero state) the OR output signal from OR/NOR gate 301 is in binary one state thereby inhibiting NOR gate 303, and the NOR output signal from OR/NOR gate 301 is binary zero. Further, the binary zero NOR signal from OR/NOR gate 288 produces a binary one NOR output signal from OR/NOR gate 302 which also acts to inhibit NOR gate 303 and in addition produces a binary zero OR signal from OR/NOR gate 302. Since all of the three signals combined at junction 304 are binary zero, the resulting output signal is also binary zero. When OR/NOR gate 288 is in the opposite state such that the OR output signal is binary zero and the NOR output signal is binary one, it is readily seen that the OR output signal from OR/NOR gate 301 is in the binary zero state while the NOR signal from gate 301 is in the binary one state. Similarly, the OR output signal from the gate 302 is in the binary one state while the NOR output signal from gate 302 is in the binary zero state. Since both input signals to gate 303 are in the binary zero state, gate 303 produces a binary one output signal which combines with the existing binary one output signals from gates 301 (NOR) and 302 (OR) to provide a relatively large composite flow signal having flow components produced by each of the three fluid amplifiers 301, 302, and 303.

Considering the system as thus far described, it is evident that the various flip-flops in the master logic unit 27, the ring counter logic 39, and the ring counter 33 must be placed in a known condition at the time of system turn-on in order to assure that erroneous logic signals do not produce a loading or unloading sequence other than the one programmed by switches 350(I–V). If, for example any of the flip-flops other than 330(6) in the ring counter were to initially be in the SET condition, the ring counter could begin sequencing at a step other than the step (1) and the tanks would not be loaded or unloaded in the desired order. Or, if any of the flip-flops 270(I–V) in the master logic unit 27 were to initially be in the SET condition, the respective NOR gates 278 would be inhibited and there could be no means for opening any of the normally closed control valves 15(I–V) as required by the automatic sequence. To assure proper flip-flop conditions at turn-on, a signal must be provided which resets each flip-flop in the system before the start of a sequencing operation. An additional consideration in this respect is that the various operator controls must be properly positioned by the operator in order that random or undetermined system sequencing does not ensue at turn-on. In order to make sure that the various system flip-flops and operator controls are initially set to assure proper operation, a novel means for generating a system CLEAR signal is disclosed herewith. This novel CLEAR signal generator 200 comprises a normally open control valve 202 and control circuitry therefore. More specifically, the control circuitry comprises a pure fluid OR/NOR gate 201 and a pure fluid NOR gate 203. Both gates 201 and 203 are connected to receive a fluid signal from fluid pressure sources 240 via START/STOP switch 280 when said switch is in its OFF position. If the START/STOP switch 280 is in the OFF position when the system power is turned on, the pressurized input signal from source 240 inhibits the NOR output signal from OR/NOR gate 201 and the NOR output signal from NOR gate 203. The OR signal from OR/NOR gate 201 is fed back through delay circuit 205 to provide another a signal for OR/NOR gate 201, which signal latches the gate in its OR mode. The binary zero output signal from NOR gate 203 does not activate the pressure transducer 207 so that no electrical signal is provided to close the normally open control valve 202. Thus a pressurized signal is provided from pressurized fluid source 204 through this normally open control valve 202, such signal comprising the CLEAR signal which sets all of the flip-flops in the system. When the START/STOP switch 280 is turned to its ON position, the fluid signal from source 240 is removed from the respective input passages of OR/NOT gate 201 and NOR gate 203. Removal of the signal from OR/NOR gate 201 has no effect thereupon since that gate has already been latched up through delay circuit 205 to provide a binary one OR signal and a binary zero NOR signal. The removal of the input signal to NOR gate 203 combined with the binary zero NOR output signal from gate 201 activates NOR gate 203 to provide a binary one signal which in turn activates transducer 207 to produce an electrical signal to close the normally open valve 202, blocking the CLEAR signal and permitting normal operation of the system.

If we now assume that the system electrical power and fluid pressure is turned on when START/STOP switch 280 is in its ON position, there is no initial input signal provided at NOR gate 203 and OR/NOR gate 201 from the source 240 so that the NOR output signal from gate 201 is in the binary one state and acts to inhibit NOR gate 203. The resulting binary zero output signal from NOR gate 203 cannot activate transducer 207, and normally open valve 202 remains open to continuously provide the CLEAR signal. When the START/STOP switch 280 is returned to the OFF position, the fluid from source 240 is conducted through the closed contacts switch 280 to provide input signals to both NOR gate 203 and OR/NOR gate 201. OR/NOR gate 201 latches up through its OR output signal as described above while NOR gate 203 is inhibited. Returning the START/STOP switch 280 to its ON position results in removal of the signal from source 240 to NOR gate 203, and since gate 201 is latched in its OR mode, there is no binary one signal applied to NOR gate 203. NOR gate 203 therefore produces a binary one output signal which, in turn, activates pressure transducer 207 to close the normally open valve 202 and terminate CLEAR signal. As is evident from the above description of the CLEAR signal generation, it is essential to the removal of the clear signal that the OR/NOR gate 201 be latched in its OR mode, and that this latching cannot occur until there is a positioning of switch 280 in its OFF position subsequent to power turn-on in the system.

In describing a typical operational sequence for loading the various storage tanks I–V it will be assumed that the tanks are to be loaded in a sequence such that tank I is filled first, tanks II and III second, tank IV is filled third and tank V is filled last. The initial switch settings should have the various override switches in units 25 and 29 in their AUTOMATIC position, the LOAD/UNLOAD switch 230 in its LOAD position, the START/STOP switch 280 in the OFF position, and the various tank sequence selector switches 350(I–V) positioned according to the desired loading sequence, namely: switch 350(I) in position (1); switches 350(II) and 350(III) in position (2); switch 350(IV) in position (3); switch 350(V) in position (4). When the electrical and pressure supplies are turned on a CLEAR signal is generated, as described in detail above, by means of a pressure signal through normally open valve 202. Upon transfer of the START/STOP switch 280 to the ON position, the CLEAR signal is removed and the system is ready to operate.

As described above in detail with respect to the description of ring counter operation, the sixth stage of the ring counter is the only one of the six ring counter stages which is cleared to its SET condition. Since stages 1–5 of the counter are cleared to their RESET condition, no binary one signal passes from the ring counter through selector switches 350 to the master logic unit OR/NOR gates 276(I–V). All of gates 276 thus provide binary zero OR output signals which fail to inhibit NOR gates 277 which in turn generate binary one output signals to inhibit NOR gate 278. This keeps the normally closed control valves 15 closed. It is apparent then that system operation can only be initiated by shifting the SET condition from stage 6 to stage 1 of the ring counter 33. This is achieved by activating the manual shift control switch 31 to produce a manual shift pulse for changing the state of commutative flip-flop 390 and associated OR/NOR gates 392, 303 and 394. This, as described above, effects the desired ring counter shift so that the SET condition is transferred to stage 1 of the ring counter. The SET condition at stage 1 results in a binary one signal at the SET output passage of flip-flop 330(1) which is amplified by flow amplifier 305 and conducted to the tank sequence selector switches 350(I–V) where it communicates with position (I) for all five switches. Since only switch 350(I) is in its position (I) only this switch will conduct a signal to the master logic circuits 27, such signal being conducted to OR/NOR gate 276(I) so as to change its NOR output signal from binary one to binary zero and its OR output signal from binary zero to binary one. The binary zero NOR output signal has the effect of activating NOR gate 275(I) to produce an output signal which in turn activates OR gate 281. The OR output signal from gate 281 activates the OR output signal from OR/NOR gate 283 which in turn inhibits NOR gate 285 and prevents generation of an automatic shift pulse at this time. The OR output signal from OR/NOR gate 276 (I) is conducted to OR gate 286 which is activated thereby to produce a binary one signal which activates OR/NOR gate 288 to produce a binary one OR signal and a binary zero NOR signal. As described above, flow amplifier 300 acts to block a binary one OR output signal from gate 288 so that the AUTOMATIC SEQUENCE OFF signal supplied to the source valve logic circuits 21 is in the binary zero state. Thus, there is no binary one input signal to NOR gate 210(A) nor to any of the three NOR gates 210(B, C, D) corresponding thereto. As a result, NOR gate 210(A) provides an inhibiting binary one signal to NOR gate 211(A) and the NOR gates 210(B, C, D) similarly act to inhibit gates 211(B, C, D) respectively. The resulting binary zero output signal from NOR gate 211(A) combined with the absence of the UNLOAD signal from switch 230 in the LOAD mode, the absence of an OFF signal from switch 280 in the ON position, and the absence of a CLOSED signal from switch 25(A) in the AUTOMATIC position permits generation of a binary one output signal from NOR gate 212(A), which signal activates pressure transducer 213(A) to open the normally closed control valve 13(A), thereby permitting liquid transfer from source tank 11 towards control valves 15(I–V). It is to be noted that valves 13(B) and 13(C) remain closed and pump 13(D) remains off due to the fact that the LOAD signal from switch 230 is present at each of NOR gates 212(B), 212(C) and 212(D) to inhibit these and prevent energization of transducers 213(B), 213(C) and 213(D).

As mentioned above, the binary one OR output signal from OR/NOR gate 276(I) is also provided as input signal to NOR gate 277(I) to inhibit the NOR output signal from the latter gate. The resulting binary zero output signal from NOR gate 277(I), combined with a binary zero SET signal from flip-flop 270(I) and the absence of input signals from switches 29(I) and 280, activate NOR gate 278(I) to produce a binary one output signal which in turn activates pressure transducer 279(I). Pressure transducer 279(I) provides an electrical signal which opens normally closed control valve 15(I) to permit the gravity fed liquid from source tank 11 to flow through open valve 13(A) and open valve 15(I) into tank I.

Before the liquid level in tank I reaches the lower sensor 171(IB) there is no pressure signal on fluid conducting path 173(IB) so that NOR gate 273(I) in the master logic unit is not inhibited thereby. However, NOR gate 273(I) is inhibited by the LOAD signal from LOAD/UNLOAD switch 230 and is therefore prevented from switching flip-flop 270(I). During loading of tank I there is no pressure signal in path 173(IA) since load sensor 171(IA) is not blocked by liquid and vents freely to ambient pressure. Consequently, NOR gate 271(I) produces a binary one output signal which acts to inhibit NOR gate 272(I) and prevent switching of flip-flop 270(I). When the liquid in tank I reaches the level of sensor 171(IA), the pressure developed in conducting path 173(IA) inhibits NOR gate 271(I), the binary zero signal from which activates NOR gate 272(I) to switch the flip-flop 270(I) to its SET condition. This results in the removal of the binary one signal from the RESET side of flip-flop 270(I), and provides it instead at the SET side of the flip-flop. The binary one SET signal inhibits OR/NOR gate 278(I), deactivating the electrical output signal from the pressure transducer 279(I) and returning valve 15(I) to its normally closed position. With valve 15(I) closed tank I no longer receives liquid and remains at its full condition. The binary zero RESET output signal from flip-flop 270(I) activates NOR gate 274(I) to provide a binary one output signal which inhibits NOR gate 275(I). This removes the input signal to OR gate 281, thereby switching OR/NOR gate 283 such that binary one NOR and binary zero OR output signals are provided, with the binary 1 NOR signal being delayed in application to NOR gate 285 by means of delay circuit 284. During the delay period there are no binary one input signals to NOR gate 285 which is therefore able to provide a binary one shift output signal, such shift signal remaining present until the binary one NOR signal from gate 283 passes through the delay circuit 284 to inhibit NOR gate 285. The shift signal, as described above, changes the state of commutative flip-flop 390 and OR/NOR gates 392, 393 and 394 to effectuate a shift in the ring counter 33 whereby the second stage of the counter assumes the SET condition while stages 1 and 3-6 assume the RESET condition. The resulting binary one SET signal from flip-flop 330(2) communicates with position (2) of each of the five selector switches 350(I–V). In accordance with our example, switches 350(II) and 350(III) are the only switches in their respective (2) positions, and therefore these two switches conduct fluid signals to respective OR/NOR gates 276(II) and 276(III) in the master logic unit. In the manner similar to that described above, for tank I, the control valves 15(2) and 15(3) are opened along with control valve 13(A) so as to permit simultaneous loading of tanks II and III, respectively. If either of tanks II or III become filled before the other, the load sensor 171(A) of the first of the two tanks to be filled will *not* cause a shift pulse to be generated. This is true because while both tanks II and III are being filled, OR gates 281 and 282 provide signals that preserve the binary one OR output signal from OR/NOR gate 283, to thereby inhibit generation of a shift pulse by NOR gate 285. Until such time as both OR gates 281 and 282 are deactivated, that is until such time as *both* tanks II and III have been filled, there is always a binary one input signal to OR/NOR gate 283 that will keep NOR gate 285 inhibited. It should also be noted that control valve 13(A) remains open during the switchover from loading tank I to the loading of tanks II and III. This is true because the binary one OR output signal from gate 276(I) acts through OR gate 286 to inhibit the NOR output signal from OR/NOR gate 288 so that the AUTOMATIC SEQUENCE OFF signal is in its binary zero state and therefore cannot act through NOR gates 210(I), 211(I) and 212(I) to close valve 13(A). When the input signal to OR/NOR gate 276(I) from switch 350(I) becomes binary zero (upon ring counter shift), there is a simultaneous presentation of a binary one input signal to OR/NOR gates 276(II) and 276(III). The binary one OR output signals from these OR/NOR gates 276(II) and 276(III) is sufficient to maintain OR/NOR gate 288 in its OR mode so that the AUTOMATIC SEQUENCE OFF signal remains in the binary zero state.

When tanks II and III have been filled, the ring counter will again be shifted by generation of an AUTOMATIC SHIFT PULSE so stage 3 assumes the SET condition while stages 1, 2, and 4–6 assume the RESET condition. Under these circumstances there is fluid communication between the SET output passage of flip-flop 330(3) and the position (3) positions on each of the five selector switches 350(I–V). Since only switch 350(IV) is in its (3) position, only this switch conducts fluid to its respective OR/NOR gate 276, in this case, gate 276(IV). Assuming that tank IV is being filled in accordance with the above described procedure, let it be further assumed that it is desired to stop loading tank IV and proceed to the loading of the next tank (V) according to the programmed sequence before tank IV has been completely filled. Under such conditions if the spring loaded manual shift switch 31 is momentarily depressed, a shift pulse will be generated which serves to effectuate a shift in the same manner as did the AUTOMATIC SHIFT pulse upon a completion of the loading of tank I and of tanks II and III as described above. In such a case, tank V would begin filling with liquid as though no interruption of the sequence had occurred. It is clear that by this procedure, one can interrupt any step in the automatic sequence and proceed to the next programmed step therein.

Now assume that the system is operating in step 2 of the programmed sequence hypothesized in the example above, in which step tanks II and III are being loaded. If at this time it is desired that tanks IV and V should have their orders in the sequence reversed so that tank V and not tank IV is loaded immediately after tanks II and III are filled, one need only change the positions of switch 350(IV) from its (3) position to its (4) position, and of switch 350(V) from its (4) position to its (3) position.

Now, when the loading of tanks II and III is completed and the ring counter shifts such that the third stage is in the SET condition, tank V will receive the fluid from the source tank 11, and upon tank V being filled, tank IV will begin loading.

It is to be noted that if there is a gap in the automatic sequence, that is, such that none of the selector switches 350(I–V) are positioned conduct fluid from a particular ring counter stage when the stage is in its SET condition, automatic sequencing will terminate after the last tanks are loaded or unloaded in accordance with the last sequential step prior to the gap. More specifically, assume that the initial settings of the selector switches for the tanks are such that switch 350(I) was in its (1) position and the switches 350 (II, III, IV and V) are in their (3) positions, leaving none of the selector switches in its (2) position. In the LOAD mode, when tank 1 is filled, a shift pulse is generated as described in detail above, and the second stage of the ring counter will be placed in its SET condition. Since none of the selector switches are in position (2), there is no fluid path provided between the SET output passage of flip-flop 330 (2) and any of OR/NOR gates 276(I–V). Thus, the OR output signals of these gates are all in the binary zero state so that neither of OR gates 286 or 287 are activated. Consequently, the NOR output signal of gate 288 is in the binary one state to produce the AUTOMATIC SEQUENCE OFF signal, which signal, as described above, inhibits NOR gates 210 (A–D). The end result is that none of the pressure transducers 213(A–D) are activated so that valves 13(A–C) remain closed and pump 13(D) remains off, thereby assuring that liquid cannot flow to or from source tank 11. The binary zero states of the OR output signals from OR/NOR gates 276(I–V) also serve to activate the NOR gate 277(I–V) which in turn inhibit OR/NOR gates 278(I–V). Thus pressure transducers 279 (I–V) remain off and keep normally closed control valves 15(I–V) closed.

To provide the system with even greater flexibility, means are provided for opening or closing any of valves 15(I–V) or 13(A–C) and for activating pump 13(D) at any time during a loading or unloading cycle. This is done by means of the override switches 25(A–D) for the valves 13(A–C) and pump 13(D) respectively, and switches 29(I–V) for valves 15(I–V) respectively. Illustratively, if switch 29(I) is placed in its CLOSED position, a pressure signal from source 260 is conducted by the means of the closed contacts of this switch to inhibit NOR gate 278(I), which, as we have described above, serves to keep control valve 15(I) closed. In a similar manner any of the individual tank control valves 15(II), 15(III), 15(IV) and 16(V) may be closed through the CLOSED contacts of respective switches 29(II), 29(III), 29(IV) and 29(V). If switch 29(I) is placed in its OPEN position, a fluid signal is provided from source 260 to inhibit NOR gate 277(I). With nor gate 277(I) inhibited, and assuming tank I is not full so that a binary one SET output signal is not provided by flip-flop 270(I), NOR gate 278(I) provides a binary one output signal which activates the pressure transducer 279(I) to in turn open control valve 15(I). Thus, regardless of the status of the automatic sequence and regardless of which step in said sequence is being performed, switches 29(I–V) can at any time close the respective control valves 15(I–V), and can open these control valves so long as the respective tanks I–V are not filled. In similar fashion it may be shown that switches 25(A–D) open or close the respective valves 13(A–C) and pump 13(D) at any time during an automatic operational sequence. Taking switch 25(A) for valve 13(A) as an example, it is evident that when switch 25(A) is placed in its CLOSED position, NOR gate 212(A) is inhibted, thereby deactivating transducer 213 (A) so as to keep valve 13(A) closed. When switch 25(A) is placed in its OPEN position, a signal is provided from source 260 to inhibit NOR gate 211(A) which removes the binary one signal from the input of NOR gate 212(A) so as to activate the latter. With NOR gate 212(A) activated, pressure transducer 213(A) is similarly activated and control valve 13(A) is opened.

Thus, the embodiment of this invention as described above provides a high degree of versatility in controlling an automatic loading or unloading sequence for a plurality of storage tanks. Not only can the sequence be modified during its operation, but it may be completely overriden by means of separate control switches on the panel of the device.

Although the system as described above specifically pertains to the control of sequential loading and/or unloading of storage tanks, it will be apparent to those skilled in the art that such system has similar applicability in the control of any sequential type of operation in which sensing means are provided to indicate completion of each step in the sequence. It follows therefore that if the material to be stored is gaseous as opposed to liquid, pressure sensors in the various tanks would be employed in place of level sensors 17. In addition, while the various control valves employed in the above system have been described as being of the solenoid type, actuable by an electrical signal, it is to be understood that fluid-actuated valves may be employed to eliminate the need for the various pressure transducers. And, as mentioned above, it is believed to be within the ability of those skilled in the art to employ electronic, photoelectric, or any other type of logic elements in place of the pure fluid elements employed herein in order to build a control system which is operative according to the above disclosure.

While we have described plural specific embodiments of our invention, it will be clear that variations of the details of construction which are specifically illustrated and described may be resorted to without departing from the spirit and scope of the invention as defined in the appended claims.

We claim:

1. A system for automatically controlling a series of sequential operations, comprising:
   selecting means for predetermining the sequence in which said operations are to be performed;
   sensor means for providing sensor signals upon completion of each operation;
   control means for initiating the first operation in the predetermined sequence in response to a command signal, and for initiating each subsequent operation of said sequence in response to said sensor signals;
   manually actuable means for modifying said predetermined sequence during any of said operations without terminating said sequence;
   wherein said control means includes:
      a binary ring counter having a number of stages equal to one more than the number of said operations to be performed, each stage having first and second bistable conditions, and each stage providing a sequence determinative signal in said first condition;
      gating means for limiting the number of stages concurrently in said first condition to one, and responsive to said manually actuable means and to said sensor means for successively shifting said first condition to sequential ring counter stages; and
      logic circuit means responsive to said sequence determinative signal and to said selecting means for controlling said operations in accordance with said predetermined sequence.

2. The system of claim 1 wherein said manually actuable means includes means for interrupting any of said operations before completion thereof and for initiating the next operation in accordance with said predetermined sequence.

3. The system of claim 2 wherein said manually actuable means additionally includes said selecting means, said selecting means being adjustable during any of said operations to change the sequential position of any unperformed operation of said sequential operations.

4. The system of claim 3 wherein said selecting means includes a plurality of single-pole multi-position switches, the number of switches and the number of positions both being equal to the number of operations to be performed, and further comprising means for connecting the sequence determinative signals from one less than all ring counter stages each to said single-pole of a different one of said switches, and means connecting each said position of said switches to a different one of said logic circuit means for conducting said sequence determinative signals to said logic circuit means in accordance with the positions of said switches.

5. The system of claim 4 wherein said means for modifying additionally includes override means for selectively initiating and terminating the performances of any of said operations at any time, regardless of the status of the predetermined sequence.

6. The system of claim 5 wherein said override means includes a plurality of manually operative switches, one each associated with a respective one of said means for initiating and terminating an operation, each switch having a first position in which it conducts a signal to said control means to initiate its associated operation, a second position in which it conducts a signal to said control means to terminate its associated operation, and a third position in which it permits performance of its respective operation in accordance with said predetermined sequence.

7. The system of claim 6 wherein said sensor means, said logic circuit means, said gating means, and said ring counter comprise pure fluid logic elements.

8. The system of claim 1 wherein said sequential operations comprise loading a plurality of storage tanks with fluid material.

9. The system of claim 8 wherein said sequential operations additionally contain unloading of said storage tanks, and wherein means are provided for selectively operating said system to perform a sequence of loading or unloading operations.

10. The system of claim 8 wherein said selecting means includes a plurality of single-pole multi-position switches, the number of switches and number of positions both being equal to the number of storage tanks and further comprising means for connecting the sequence determinative signals from all but one of the ring counter stages to respective ones of said positions on all of said switches, and means connecting said switches to said logic circuit means for conducting different ones of said sequence determinative signals to said logic circuit means in accordance with the positions of said switches.

11. The system of claim 8 wherein said manually actuable means includes means for interrupting the loading operation of any one of said tanks and for initiating the next loading operation in accordance with said predetermined sequence.

12. The system of claim 11 wherein said manually actuable means additionally includes said selecting means, the latter being adjustable during any of said loading operations to change the sequence in which any unload tanks are loaded.

13. The system of claim 12 wherein said selecting means includes a plurality of single-pole multi-position switches, the number of switches and number of positions both being equal to the number of storage tanks, and further comprising means for connecting the sequence determinative signals from one less than all of the ring counter stages to respective ones of said positions on all of said switches connecting said switches to said logic circuit means for conducting different ones of said sequence determinative signals to said logic circuit means in accordance with the positions of said switches.

14. The system of claim 12 wherein said sequential operations comprise loading and unloading of said storage tanks, and further comprising means for selectively operating said system in either the load or unload mode.

15. The system of claim 14 wherein said selecting means includes a plurality of single-pole multi-position switches, the number of switches and number of positions both being equal to the number of storage tanks, and further comprising means for connecting the sequence determinative signals from all but one of the ring counter stages to respective ones of said positions on all of said switches, and means connecting said switches to said logic circuit means for conducting different ones of said sequence determinative signals to said logic circuit means in accordance with the positions of said switches.

16. The system of claim 15 wherein said means for modifying additionally includes override means for selectively initiating and terminating the performance of any of said loading and unloading operations at any time, regardless of the status of the predetermined sequence.

17. The system of claim 16 wherein said override means includes a plurality of manually operative switches, one each associated with a respective one of said storage tanks, each switch having a first position in which it conducts a signal to said control means to initiate loading or unloading of its associated tank, a second position in which it conducts a signal to said control means to terminate loading or unloading of its associated tank and a third position in which it permits loading or unloading of its respective tank in accordance with said predetermined sequence.

18. The system of claim 17 wherein said sensor means, said logic circuit means, said ring counter, and said gating means comprise pure fluid logic elements.

19. The system of claim 1 wherein said sequential operations comprise unloading a plurality of storage tanks with fluid material.

20. The system of claim 1 wherein said selecting means includes a plurality of single-pole multi-position switches, the number of switches being equal to the number of operations to be performed and the number of positions being equal to at least the number of operations to be performed, and further comprising means for connecting the sequence determinative signals from all but one of the ring counter stages to respective ones of said positions on all of said switches, and means connecting said switches to said logic circuit means for conducting different ones of said sequence determinative signals to said logic circuit means in accordance with the positions of said switches.

21. The system of claim 20 wherein said sensor means, said ring counter, said logic circuit means, and said gating means comprise pure fluid logic elements.

22. A system for automatically controlling a series of sequential operations, comprising:
selecting means for predetermining the sequence in which said operations are to be performed;
sensor means for providing fluid sensor signals upon completion of each operation;
fluidic control means for initiating the first operation in the predetermined sequence in response to a fluid command signal, and for initiating each subsequent operation of said sequence in response to said fluid sensor signals;
manually actuable means for modifying said predetermined sequence during any of said operations without terminating said sequence;
wherein said means for modifying includes override means for selectively initiating and terminating the performance of any of said operations at any time, regardless of the status of the predetermined sequence; and
wherein said override means includes a plurality of fluid signal switches, one each associated with a respective one of said means for selectively initiating and terminating an operation, each switch having a first position in which it conducts a fluid signal to said fluidic control means to initiate its associated operation, a second position in which it conducts a fluid signal to said fluidic control means to terminate its associated operation, and a third position in which it permits performance of its respective operation in accordance with said predetermined sequence.

23. The system according to claim 22 wherein said sequential operations comprise loading and unloading a plurality of storage tanks with liquid, wherein said sensor means comprises respective fluidic liquid level detectors for detecting the liquid level at each of said storage tanks and providing a fluid full signal for each tank when the liquid level in that tank exceeds a first predetermined height and a fluid empty signal for each tank when the liquid level in that tank is below a second predetermined height, and wherein said control means includes fluidic logic circuitry responsive to said fluid full and empty signals for initiating said subsequent operations.

24. The system of claim 22 wherein said manually actuable means includes said selecting means, the latter being adjustable during any of said operations to change the sequential position of any unperformed operation of said sequential operations.

25. The system according to claim 24 wherein said manually actuable means additionally includes said selecting means, said selecting means being adjustable during any of said operations to change the sequential position of any unperformed operation of said sequential operations.

26. The system according to claim 25 wherein said sequential operations comprise loading and unloading a plurality of storage tanks with fluid material.

27. A fluid flow amplifier of the pure fluid type for amplifying an input fluid signal comprising:
first fluid amplifier means for providing a first fluid output signal in response to the presence of said input signal, and for providing a second fluid output signal in response to the absence of said input signal;
second fluid amplifier means responsive to the absence of said second output signal for providing a third fluid output signal;
combining means for summing said first and third output signals to provide a signal which is present only when said input signal is present and which is substantially amplified with respect to said input signal.

28. The amplifier of claim 27 further comprising:
means for providing a second input fluid flow signal which is the complement of said input signal;
third amplifier means for providing a fourth fluid output signal in response to said second input signal and a fifth fluid output signal in response to the absence of said second input signal; and
wherein said second amplifier means is additionally responsive to the absence of said fourth output signal such that said third output signal is provided only when both said second and fourth output signals are absent; and
wherein said combining means sums said first, third and fifth output signals.

29. The fluid amplifier of claim 28 wherein said first, second and third amplifier means each comprise pure fluid OR/NOR gates of the type which provide an OR output signal in response to the presence of an input signal and a NOR output signal in response to the absence of all input signals and wherein said first output signal corresponds to the OR output signal of said first amplifier means, said second output signal corresponds to the NOR output signal of said first amplifier means, said third output signal corresponds to the NOR output signal of said second amplifier means, said fourth output signal corresponds to the OR output signal of said third amplifier means, and said fifth output signal corresponds to the NOR output signal of said third amplifier means, (References on following page)

References Cited

UNITED STATES PATENTS

| | | |
|---|---|---|
| 3,131,710 | 5/1964 | Ludwig et al. __ 137—101.25 XR |
| 3,250,471 | 5/1966 | Gobhai et al. |
| 3,277,914 | 10/1966 | Manion _____ 137—81.5 |
| 3,306,539 | 2/1967 | Grimland. |
| 3,340,885 | 9/1967 | Bauer _____ 137—81.5 |
| 3,353,549 | 11/1967 | Walker et al. _____ 137—101.25 |
| 3,369,557 | 2/1968 | Wood _____ 137—81.5 |
| 3,251,547 | 5/1966 | Hatch. |

SAMUEL SCOTT, Primary Examiner

U.S. Cl. X.R.

137—81.5; 235—201